April 26, 1966        S. FRIED        3,248,555
AUTOMATIC ENGINE STARTER
Filed July 26, 1963
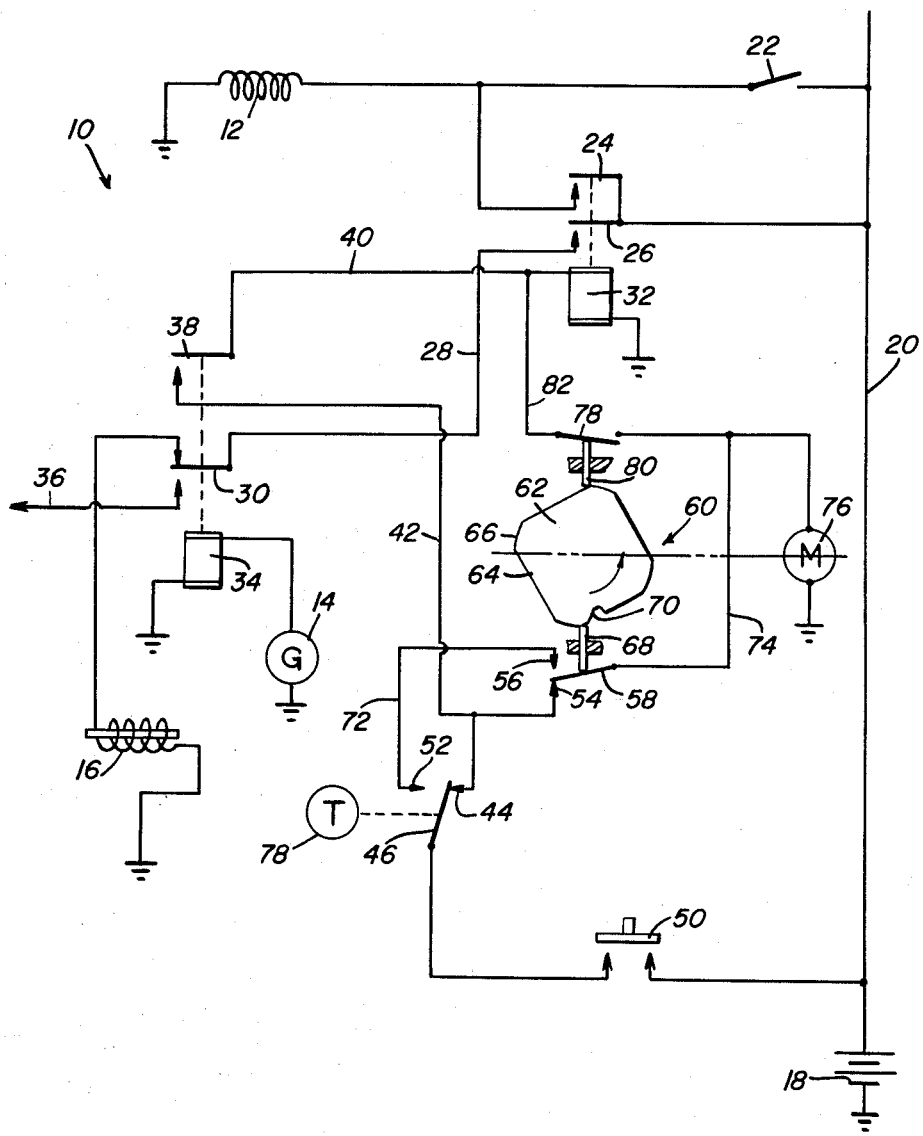
Samuel Fried
INVENTOR.

United States Patent Office 3,248,555
Patented Apr. 26, 1966

3,248,555
AUTOMATIC ENGINE STARTER
Samuel Fried, Omaha, Nebr., assignor of fifty percent to Robert Gerelick, Omaha, Nebr.
Filed July 26, 1963, Ser. No. 297,902
1 Claim. (Cl. 290—38)

This invention relates to an automatic starting system for internal combustion engines or the like.

Various time controlled systems have heretofore been devised for starting vehicle engines without any supervisory control. These prior systems have however been characterized by complex circuitry and control components which render the system costly and requires extensive modification of the vehicle or engine structure. Also, systems heretofore utilized were restricted to engines employing particular components. It is therefore the primary object of the present invention to provide an engine starting system of the automatic type which is applicable to engines of various types and requires little modification thereof for installation of this system.

Another object of the present invention is to provide an automatically operative engine starting system which will be automatically reset upon completion of a cycle of operation.

A still further object of the present invention is to provide an automatically operative engine starting system employing a motor operated cam assembly through which energization of the cam motor is controlled and periodic attempts made to start the engine during a predetermined cycle. Upon termination of the cycle, the system stops operation and is automatically reset for a new cycle of operation. Accordingly, no excessive drain will be imposed upon the battery source of electrical energy to which the system may be connected.

The system of the present invention because of its easy installation and low cost, may be widely utilized in connection with automotive vehicles for various purposes including for example warming the engine and vehicle compartment during winter months, cleaning the windshield prior to the arrival of the vehicle driver, starting operation of the vehicle air conditioning system prior to arrival of the driver during summer months and controlling operation of other accessory equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The figure of the drawing is an electrical circuit diagram showing the operation relationships between the diagrammatically illustrated components forming the system of the present invention.

Referring now to the drawing in detail, it will be observed that the engine starting system generally referred to by reference numeral 10 is associated with the grounded ignition coil 12 of a vehicle engine which may also be provided with a generator 14 and with a starter solenoid 16 for initiating operation of the starter device. Energy for operating the system 10 may be derived from the vehicle source of power such as the battery 18. Accordingly, the electrical equipment associated with the vehicle is connected to the battery 18 by means of the power line 20 which is also connected through the driver control ignition switch 22 to the ignition coil 12. It will be noted however, that the ignition switch 22 may be by-passed by closing of the relay switch 24 interconnecting the power line 20 to the ignition coil 12 in parallel relation to the ignition switch 22. The relay switch 24 is however normally open and is associated with a second normally opened relay switch 26 by means of which the power line 20 is electrically connected through the conductor 28 and normally closed relay switch 30 to the solenoid coil 16 for the starter. It will therefore be apparent, that upon energization of the control relay 32, closing of the relay switches 24 and 26 will establish energizing circuits from the battery 18 through the ignition coil 12 and the starter solenoid coil 16.

When the starter solenoid 16 is energized, the engine will be cranked in a manner well known to those skilled in the art so as to start operation thereof. Once the engine has started, it will then be desirable to effect deenergization of the starter solenoid coil 16. Toward this end, the normally closed relay switch 30 is opened by energization of a current responsive relay 34. The relay 34 is therefore electrically connected to the output of the engine generator 14 as one method for sensing that the engine has been successfully started. Also, when the relay switch 30 is actuated by energization of the relay 34, an energizing circuit is established for accessories connected to the conductor 36 through the actuated relay switch 30, conductor 28 and the closed relay switch 26 connected to the power line 20. At the same time that the relay switch 30 is actuated in response to successful starting of the engine, the normally opened relay switch 38 is also closed so as to establish a relay holding circuit for the relay 32.

The holding circuit for the relay 32 includes the conductor 40 connecting the relay 32 to the relay switch 38 which in turn is connected by the conductor 42 to contact 44 of a timer switch 46 actuated by means of a timer device 48. The timer switch 46 is connected to the power line 20 from the battery 18 by closing of a gear switch 50. The gear switch 50 is adapted to be closed when the vehicle transmission is in a "park" position. In this manner, theft of the vehicle is prevented since movement of the vehicle will be impossible when the transmission is in a parked condition. The relay holding circuit will therefore maintain the relay 32 energized only when the timer switch 46 is in an active starting position engaging the contact 44. It will however be appreciated, that the relay 32 must be initially energized in an attempt to start the engine.

A second contact 52 is associated with the timer switch 46 and engaged thereby when the timer switch is in its inactive resetting position. The timer switch contacts 44 and 52 are therefore respectively electrically connected to the contacts 54 and 56 associated with a cam operated switch 58. The cam operated switch 58 is associated with a motor controlled cam assembly generally referred to by reference numeral 60 by means of which operation of the system is limited to a predetermined operational cycle after which the system stops operating and during which operational cycle, a predetermined number of attempts are made to start the engine. The cam assembly 60 therefore includes a rotatable cam member 62 having a radial cam periphery including four flat sides 64 interconnected by arcuate portions 66. Rotation of the cam member 62 will therefore be operative to hold the cam operated switch 58 in engagement with the contact 54 by means of the slidably mounted actuator element 68 that rides on the radial cam contour of the cam member. A recess 70 is therefore formed in the cam contour so that in one angular position of the cam member, the switch actuating follower element 68 will effect displacement of the cam operated switch member 58 to a reset position in engagement with the contact 56. Accordingly, when the cam member and the cam operated switch member 58 are in the reset condition, movement of the cam member 62 will have stopped. Displacement of the cam member 62 from its reset position to its start position as illustrated in the drawing may then be effected only by displacement of the timer switch 46 into reset position in engagement with the contact 52 so that an energizing circuit will be established from the battery 18 through gear switch 50, timer switch 46, conductor 72, cam operated switch 58 and conductor 74 through the cam motor 76. Thus, energization of the motor 76 will cause counterclockwise rotation of the cam member from its reset position to the illustrated start position. When displaced to the start position, the energizing circuit for the motor 76 will be opened since the cam operated switch member 58 is displaced out of engagement with the contact 56 into engagement with the contact 54. The cycle of operations may then be initiated by displacement of the timer switch 46 into engagement with the contact 44. The motor 76 will then be energized so as to effect continuous rotation of the cam member 62 until it returns to the reset position with the element 68 received within the recess 70 thereby effecting displacement of the cam operated switch 58 to its reset position in engagement with the contact 56 once again.

During the continuous rotation of the cam member 62 from its start position to its reset position, the control switch 78 will be displaced between an open and closed position four times. Accordingly, a follower element 80 is slidably mounted between the cam periphery and the control switch 78 for displacement thereof to a closed position each time the element 80 is engaged by the arcuate portions 66 of the cam member. It will therefore be apparent, that when the control switch 78 is closed, the relay 32 will be initially energized by an energizing circuit established through the closed gear switch 50, the timer switch 46 in engagement with contact 44, the cam operated switch 58 in engagement with the contact 54, and the conductor 82 connecting the closed control switch 78 to the relay. Energization of the relay 32 will thereby close the relay switches 24 and 26 so as to effect starting of the engine by energization of the ignition coil 12 and the starter solenoid 16 as hereinbefore indicated. If starting of the engine is successful as hereinbefore indicated, a holding circuit for the relay 32 is established through conductor 42 and the closed relay switch 38 so as to hold the relay switches 24 and 26 closed when the control switch 78 is opened by continued rotation of the cam member 62.

Operation of the automatic starting system will be apparent from the foregoing description, it will therefore be appreciated, that the system will be operative only when the transmission is in a park condition closing the switch 50 so as to establish a conductive path from the battery 18 to the timer switch 46. The timer device 48 may then be set to start operation of the system at some predetermined time. When so set, the timer switch 46 will be displaced to its reset position in engagement with the contact 52. If the cam switch 58 is in a reset position engaging the contact 56, an energizing circuit is established through the cam motor 76 so as to cause displacement of the cam member from its reset position to the starting position illustrated in the drawing. The system will then be conditioned for automatic operation when the timer device 48 subsequently displaces the timer switch 46 to its starting position engaging the contact 44. An energizing circuit will then be reestablished for the motor 76 so as to effect continuous rotation of the cam member 62. During rotation of the cam member, the control switch 78 will be closed four times before the cam member returns to the reset position. Each time the control switch 78 is closed, an energizing circuit is established for the relay 32 so that the relay switches 24 and 26 are closed in order to provide energizing circuits for the ignition coil 12 and the starter solenoid 16 in an attempt to start the engine. Should the engine be successfully started during any of the aforementioned attempts initiated by closing of the control switch 78, the current responsive relay 34 will be energized so as to interrupt the energizing circuit for the starter solenoid 16 while at the same time establishing an energizing circuit for the accessories through the line 36. Also, a relay holding circuit is established for the relay 32 so that it will be maintained energized thereafter when the control switch 78 is open. It will therefore be apparent, that four attempts will be made to start the engine after which the system will stop operation since the cam operated switch 58 will be displaced to its reset position in order to avoid imposing any continued current drain on the battery 18. When the timer cycle has been completed, the timer switch 46 will be displaced to its reset position out of engagement with the contact 44 thereby stopping the engine since the holding circuit for the relay 32 will then be interrupted. In this manner, the engine may be started at a predetermined time and kept running for a predetermined period after which it is shut down without any supervisory control. During most of this engine running period, the system will be in an inactive condition since the motor 76 will be disconnected from the battery source of power.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An automatic starting system for engines having an ignition coil and a starter device comprising, a source of electrical energy, timer controlled switch means operatively connected to said source and movable between a starting and a resetting position, cam operated switch means displaceable between a starting position and a resetting position, motor means electrically connected to said cam operated switch means for energization by said source when both of said switch means are either in the starting positions or the resetting positions, cam means drivingly connected to the motor means for effecting displacement of the cam operated switch means between the starting position and the resetting position once each operational cycle of movement of the cam means, control switch means electrically connected to the cam operated switch means and responsive movement of the cam means for periodic displacement thereof between closed and open positions during said operational cycle, relay means energized by the source through the control switch means when in the closed position for connecting the ignition coil and the starter device to the source and means responsive to starting of the engine for holding said relay means energized when the control switch means is in the open position.

References Cited by the Examiner

UNITED STATES PATENTS

| | | | |
|---|---|---|---|
| 2,374,251 | 4/1945 | Wallace | 290—30 X |
| 2,748,759 | 11/1953 | Schiffor | 200—38 X |
| 2,791,699 | 5/1957 | Taylor | 290—629 |
| 2,878,436 | 3/1959 | Mundt | 318—470 X |
| 2,912,051 | 10/1959 | Albert | 378—466 |
| 2,930,860 | 3/1960 | Terry | 200—38.1 |
| 3,154,689 | 9/1961 | Bubbenmoyer | |

ORIS L. RADER, *Primary Examiner.*

G. SIMMONS, *Assistant Examiner.*